United States Patent [19]

Cowett, Jr.

[11] Patent Number: 4,669,036
[45] Date of Patent: May 26, 1987

[54] D.C. TO D.C. CONVERTER POWER SUPPLY WITH DUAL REGULATED OUTPUTS

[75] Inventor: Philip M. Cowett, Jr., Baltimore, Md.

[73] Assignee: Allied Corporation, Morristown, N.J.

[21] Appl. No.: 874,196

[22] Filed: Jun. 13, 1986

[51] Int. Cl.⁴ .................. G05F 1/56; H02M 3/335
[52] U.S. Cl. .............................. 363/21; 363/41; 363/97; 323/266; 323/267
[58] Field of Search .............. 363/21, 41, 89, 97, 363/98; 323/266, 267

[56] References Cited

U.S. PATENT DOCUMENTS

| | | | |
|---|---|---|---|
| 3,671,853 | 6/1972 | Weischedel et al. | 323/267 |
| 4,037,271 | 7/1977 | Keller | 363/80 X |
| 4,322,817 | 3/1982 | Kuster | 363/41 X |
| 4,327,404 | 4/1982 | Horiguchi | 363/21 X |
| 4,353,113 | 10/1982 | Billings | 363/21 |
| 4,449,173 | 5/1984 | Nishino et al. | 363/21 |

Primary Examiner—Patrick R. Salce
Assistant Examiner—Emanuel Todd Voeltz
Attorney, Agent, or Firm—Bruce L. Lamb; Robert M. Trepp

[57] ABSTRACT

A d.c. to d.c. converter power supply having two substantially independent regulated outputs. A pulse width modulator (PWM) converts input d.c. to a.c. having a variable frequency and a variable duty cycle. The a.c. is applied to a transformer having two secondary windings for separate d.c. outputs. One of the secondary windings feeds a rectifier having a capacitor input type filter and means for regulating the output voltage by controlling the duty cycle of the PWM. The other secondary winding feeds a rectifier having a choke input type filter and means for regulating the output voltage by controlling the frequency of the PWM.

4 Claims, 4 Drawing Figures

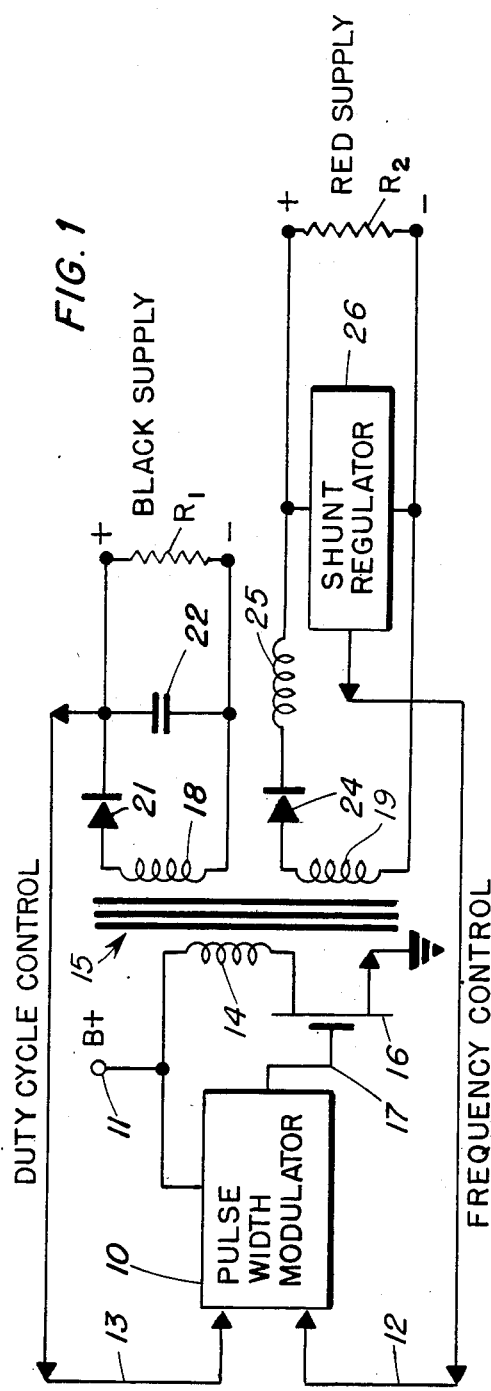
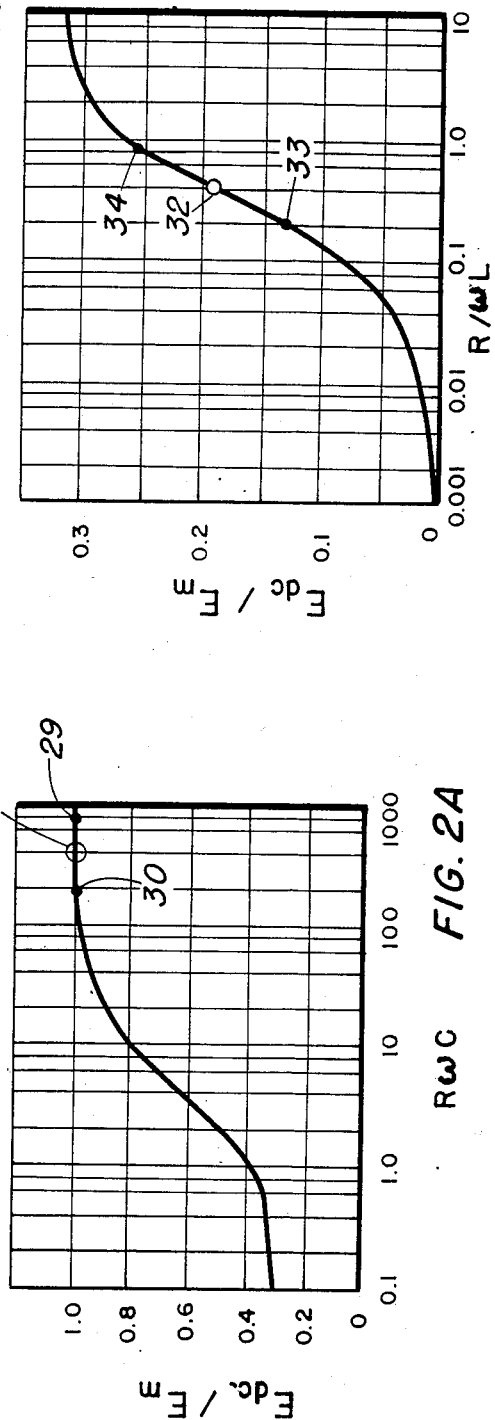

D.C. TO D.C. CONVERTER POWER SUPPLY WITH DUAL REGULATED OUTPUTS

The present invention relates to regulated direct current power supplies. More particularly, it relates to direct current regulated power supplies of the switching or pulse width modulator type providing multiple output voltages.

Power supplies in which the output voltage is regulated through control of the duty cycle of an input power switch are known in a variety of designs. Among these are power supplies providing multiple output voltages such as are disclosed in U.S. Pat. Nos. 4,037,271; 4,353,113; 4,449,173 and 4,517,633. The power supplies of the cited references either employ separate switching type regulators for each of the output voltages which are independently regulated or employ a single switching type regulator for regulation of a single output voltage with the voltages of the remaining outputs being dependent upon the load conditions in the regulated output voltage circuit.

Certain communications equipment requires the provision of two separate d.c. power supplies having two output voltages which are regulated independently of one another. The separate power supplies are customarily referred to as "red" and "black" power supplies. Past practice has been to construct the red and black power supplies as d.c. to d.c. converters using a transformer having a primary winding connected through a pulse width modulated power switch to a d.c. source. Two separate secondary windings of the transformer furnish the inputs to separate rectifiers for the separate red and black output voltages. The black output voltage is sensed and fed back to the pulse width modulator controlling the input power switch for regulation of the black output voltage. The red output voltage is regulated by a shunt type regulator in which a source resistor or constant-current source, connected in series with the red output voltage line, is responsible for dissipating a substantial portion of the output capacity of the red supply to achieve regulation.

In red-black power supplies of this type, regulation of the red output voltage is accomplished substantially independently of the regulation of the black output voltage but at less than optimum efficiency because of power dissipation in the source resistor.

It is the object of the present invention to provide a voltage regulated red-black power supply of the pulse width modulated type which is simpler and which operates at greater efficiency than prior equivalent types.

Other objects and advantages of the invention will become evident as a complete understanding thereof is gained through study of the following detailed description and the accompanying drawings.

BRIEF DESCRIPTION

Briefly, the invention comprises a red-black power supply in which power from a d.c. source is applied to a transformer primary winding through an input switch which is controlled by a pulse width modulator. The transformer includes two separate secondary windings, each of which may have multiple taps and rectifiers. One of the transformer secondary windings provides alternating voltage inputs to the black supply while the remaining transformer secondary winding provides alternating voltage inputs to the red supply. One of the taps of the secondary winding for the black supply, through its associated rectifier, supplies d.c. to a capacitor input type filter, the output of which constitutes the main black supply output voltage. One of the taps of the secondary winding for the red supply, through its associated rectifier, supplies d.c. to a choke input type filter, the output of which constitutes the main red supply output voltage. The main black supply output voltage is regulated by feeding back any output voltage error to the pulse width modulator on the transformer input side to cause adjustment of the duty cycle of the transformer input waveform. The main red supply output voltage is regulated, for small variations in load current, by a shunt type regulator. For large variations in load current of the red supply, the current in the shunt regulator is sensed, and when the current therein becomes excessively high or low, a control voltage is fed back to the pulse width modulator on the transformer input side to cause adjustment of the frequency of the transformer input waveform.

The capacitor input filter of the black supply is so designed that variation in the frequency of the transformer secondary voltage has little effect on the d.c. output voltage thereof. However, the choke input filter of the red supply is so designed that variation in the frequency of the transformer secondary voltage has a substantial effect on the d.c. output voltage thereof. Thus, regulation of the output voltages of both the red and black supplies is achieved substantially independently of one another and at high efficiency since power consumption by the shunt regulator of the red supply is reduced to a minimal amount by relying principally on variation of inductive reactance for control of the red supply output voltage.

DESCRIPTION OF THE DRAWINGS

FIG. 1 is a simplified block diagram of the invention;

FIG. 2A is a chart showing the variation in the d.c. output voltage of a half-wave, capacitor input filter power supply for variation in the load resistance/capacitive reactance;

FIG. 2B is a chart showing the variation in the d.c. output voltage of a half-wave choke input filter for variation in load resistance/inductive reactance.

DETAILED DESCRIPTION

Figure 3:
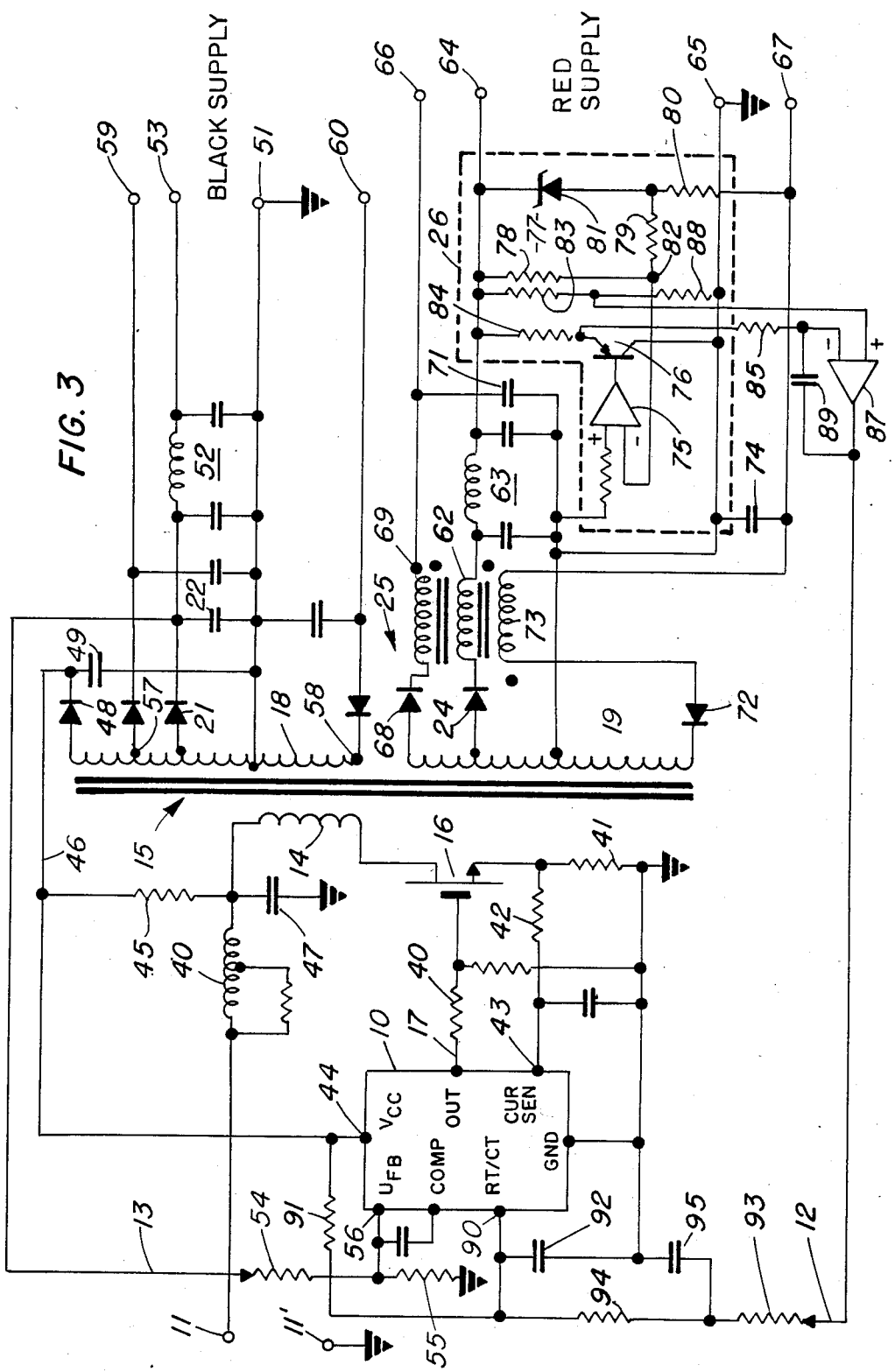
FIG. 3 is a schematic diagram of one specific embodiment of the invention.

FIG. 1 is a simplified block diagram of the invention. A pulse width modulator (PWM) 10 receives input power from a d.c. source 11, such as a battery or a rectifier, and provides a low power square wave output having a frequency determined by the voltage on line 12 and a duty cycle determined by the voltage on line 13. Source 11 is also connected to one terminal of a primary winding 14 of a transformer 15. The end terminal of winding 14 is connected to a switching device 16, shown as an FET with the drain electrode connected to winding 14 and the source electrode connected to the ground of source 11.

Switch 16 is switched alternately between on and off states by the square wave output of PWM 10 applied through line 17 to the FET gate electrode. The current flow in primary winding 14 has a frequency and duty cycle corresponding to those of the PWM output. Transformer 15 has secondary windings 18 and 19 thereon in which the frequency and duty cycle of the voltages induced therein are dependent upon the like parameters of the waveform of the current in primary winding 14.

Secondary winding 18 is connected through a half-wave diode rectifier 21 to one terminal of a capacitor 22, the other terminal of which is connected to the end terminal of winding 18. Connections are extended from the terminals of capacitor 22 to form the positive and negative output terminals of one power supply, here designated the "black" supply, furnishing d.c. to a load represented by resistor $R_1$.

Secondary winding 19 is connected through a half-wave diode rectifier 24 to the input of an inductor 25. A connection from the output of inductor 25 extends to the positive output terminal of the second power supply, here the "red" supply. A connection extends from the end terminal of winding 19 to the negative terminal of the red supply. The red supply furnishes d.c. to a load represented by resistor $R_2$.

The output voltage of the black supply is regulated by controlling the duty cycle of the PWM10 through the feed back connection 13 from the black supply output to a duty cycle control input on the PWM. The output voltage of the red supply is regulated, as to relatively small changes in the red supply load current, by a shunt regulator 26 connected in parallel with the red supply load $R_2$. Shunt regulator 26 diverts a portion of the current flowing in inductor 25 from entering the load $R_2$ and tends to maintain the red supply output voltage constant by variation in the voltage drop across inductor 25 proportionately to the current flow through the shunt regulator.

Shunt regulator 26 is designed to operate with a small, fairly constant current therethrough. When excessive increases or decreases in shunt current become necessary to maintain constant the red supply output voltage, shunt regulator 26 alters the voltage on line 12 to effect a change in the frequency of the output waveform of PWM 10. When the output voltage of the red supply tends to become higher, current in the shunt regulator 26 increases above nominal and a change in the voltage on line 12 is produced in such a sense as to increase the frequency of the PWM output. The increase in frequency of the PWM output increases the reactance of inductor 25 and reduces the d.c. voltage of the red supply output. When the output voltage of the red supply tends to become low, the voltage on line 12 changes in the opposite sense. The frequency of the output of PWM10 decreases, the reactance of inductor 25 decreases and the red supply d.c. voltage is increased.

A change in the frequency of the output of PWM10 affects not only the reactance of inductor 25 but also the reactance of capacitor 22. However, the capacity of capacitor 22 is selected to be large enough that the reactance thereof can be varied over a wide range without causing a variation in the d.c. voltage output of the black supply.

A change in the duty cycle of the output of PWM10 affects equally the d.c. voltage outputs of the red and the black supplies. When the black supply is connected to a reasonably stable load, the duty cycle of the PWM output can be expected to remain reasonably constant during regulation of the output voltage of the black supply. Because variation in the reactance of capacitor 22 has substantially no effect on the output voltage of the black supply, the output voltage of the red supply can be regulated through control of the frequency of the PWM output for wide variations in the load of the red supply, and such regulation of the red supply is achieved substantially independently of the black supply. The independence of the red supply regulation from the black supply regulation is explained with reference to FIGS. 2A and 2B.

FIGS. 2A and 2B are charts taken from the book "Electronic Engineering Principles" by John D. Ryder, published 1952 by Prentice-Hall showing respectively the variation in d.c. voltage output (Edc/Em) for variation in the ratio of load resistance to capacitive reactance (R$\omega$C) for a half-wave rectifier with a capacitor input filter and the variation in d.c. voltage output (Edc/Em) for variation in the ratio of load resistance to inductive reactance (R/$\omega$L) for a half-wave rectifier with an inductor input filter. In both Figs., Em is the peak a.c. voltage applied to the rectifiers.

FIG. 2A illustrates the characteristics of the black supply of FIG. 1. The capacity of capacitor 22 is selected so that at a nominal output frequency, say 200 KHz and at nominal output voltage and load, the ratio of load resistance to capacitive reactance (RWC) has a value of, say 400, placing the nominal operating point at 28 on the curve. Then the PWM output frequency can be doubled (RWC=800), moving the operating point to 29, or halved (RWC=200), moving the operating point to 30, without affecting the black supply d.c. voltage.

The red supply characteristics are shown in FIG. 2B. The inductance of inductor 25 is selected so that at a nominal output frequency of 200 KHz for the PWM and at nominal voltage and load the ratio of load resistance to inductive reactance (R/WL) has a value of, say 0.4, placing the nominal operating point at 32 on the curve. Then doubling the frequency of the PWM output moves the operating point to 33 (R/WL=0.2) reducing Edc/Em from 0.2 to about 0.13, resulting in a change in the d.c. output voltge of about 35% and halving the frequency moves the operating point to 34 (R/WL=0.8), increasing Edc/Em from 0.2 to about 0.26, resulting in a change in the d.c. output voltage of about 30%. As shown with reference to FIG. 2A, similar changes in the PWM output frequency have no appreciable effect in the output voltage of the black supply.

FIG. 3 is a schematic diagram of an actual embodiment of the invention. PWM10 may suitably comprise a commercially available integrated circuit type UC1843, a product of Unitrode Corporation, Lexington, Mass., 02173. Input power is supplied from a 17–33 V.d.c. source to terminals 11, 11'. A connection extends from terminal 11 through a spike suppressor filter 40 to one end of primary winding 14 of transformer 15. The opposite end of primary 14 is connected to the drain electrode of FET 16, suitably type UFNF110, the source electrode of which is connected to ground through and input current sensing resistor 41. The high end of resistor 41 is connected through a short time constant RC filter 42 to the current sense input terminal 43 of PWM10. The switch action of FET 16 is controlled by the output waveform of PWM10, which appears on terminal 17 and is applied through resistor 40 to the FET gate electrode.

PWM10 receives supply voltage on terminal 44 via resistor 45 and line 46 from the secondary side of transformer 15. When power is first applied to terminal 11, the inrush current through filter 40 charges capacitor 47 to a level sufficient to initiate oscillation in PWM10. Thereafter, continuous oscillations are sustained by the d.c. voltage on line 46 obtained from the half-wave rectifier comprising diode 48 and capacitor 49 connected across a portion of secondary winding 18.

The main black supply comprises diode 21 connected to an intermediate tap on secondary winding 18 and capacitor input filter 22 connected between the cathode of diode 21 and the black supply ground line 51. A pi-type ripple filter 52 follows capacitor input filter 22 and delivers, in this specific embodiment, 5 V.d.c. to terminal 53. Taps 57 and 58 connected, respectively, through positively and negatively poled diodes to terminals 59 and 60, provide auxilliary voltage outputs of +6.7 V. and −6.7 V.

The voltage on terminal 53 is regulated by the feedback connection 13 from the high side of capacitor 22 to a 2:1 voltage divider, resistors 54 and 55. A connection extends from the junction of resistors 54 and 55 to input terminal 56 of PWM10. The PWM includes an internal voltage reference of 2.5 V. and operates to vary the duty cycle of the output waveform so as to maintain the feedback voltage on terminal 56 at 2.5 V.

The main red supply comprises diode 24 having the anode thereof connected to an intermediate tap on secondary winding 19. The cathode of diode 24 is connected through one winding 62 of trifilar wound choke 25 to the input of a pi-type ripple filter 63, the output of which extends through shunt regulator 26 to output terminal 64. The red supply ground extends from the center tap of winding 19 to terminal 65. Positive and negative auxiliary output voltages are provided on terminals 66 and 67 by positively poled diode 68 connected to an end tap of winding 19, then through winding 69 of choke 25 to filter capacitor 71 and to terminal 66 and by negatively poled diode 72 connected from the other end tap of winding 19 through winding 73 of choke 25 to filter capacitor 74 and to terminal 67. In this specific embodiment of the invention, the output voltages and load ratings at terminals 64, 66 and 67 are, respectively, +5 V. reg. @0.4–1 A.; +6.7 V. reg. @40 mA.; and −6.7 V. reg. @40 mA.

Shunt regulator 26 includes an operational amplifier 75, a transistor 76 and a voltage sensing network 77. Sensing network 77 is formed by resistors 78, 79 and 80 connected in series from the +5 V. output line to the −6.7 V. output line and by Zener diode 81 connected from the +5 V. output line to the junction of resistors 79 and 80. The network resistor values and Zener voltage of the diode are selected to provide a virtual ground, i.e. 0 V., at junction 82 when the voltage at terminal 64 is equal to the rated regulated voltage output, i.e. 5 V. The voltage at the junction 82 is compared to actual ground in the operational amplifier 75 which controls the conduction of transistor 76 to increase or decrease in proportion to the increase or decrease of the junction 82 voltage above or below ground.

An increase in the current conducted by transistor 76 increases the voltage drop across winding 62 and filter 63 and reduces the output voltage at terminal 64 proportionately to maintain that voltage constant. For reason of efficiency, it is desired that regulation of minor variations in the output voltage be accomplished in this manner. Larger variations in the red supply output voltage are regulated by control of the PWM output frequency, as follows.

Current flow through transistor 76 is sensed by determining the voltage drop across a low value resistor 84 in the emitter circuit of the transistor. A connection extends from the low end of resistor 84 through resistor 85 to the inverting input of an operational amplifier 87.

The non-inverting input of amplifier 87 is taken from the junction of resistors 83 and 88. Amplifier 87 functions as an integrator due to feedback capacitor 89 connected from the output to the inverting input. Short duration transients in the voltage drop across resistor 84 produce a comparatively small change in the output voltage of amplifier 87. Longer duration changes in the input voltage produce an amplifier output change in proportion to the amplitude and duration of the input voltage and such output is retained after termination of the input.

The output frequency of PWM10 is ordinarily established at some constant value by a resistor connected from a reference voltage source to the RT/CT input, terminal 90, of the PWM and by a capacitor connected from terminal 90 to ground. In this specific application, the output frequency of PWM10 is established at a nominal value of about 200 KHz by resistor 91 connected from the supply voltage line 46 to terminal 90 and by capacitor 92 connected from terminal 90 to ground. The frequency of the PWM is then made to vary from the nominal value in accordance with the output of amplifier 87 by feeding back the output of amplifier 87 on line 12 through resistors 93 and 94 to terminal 90. Capacitor 95, in conjunction with resistor 93, moderately smooths the output of amplifier 87 prior to application to terminal 90 through resistor 94.

When the red supply output voltage on terminal 64 increases above the rated value, the voltage at junction 82 rises above virtual ground to a positive level, causing increased conduction by transistor 76, increasing the voltage drop across resistor 84 and reducing the voltage level at the inverting input of amplifier 87. The output of amplifier 87 increases in proportion to the reduction and duration of the voltage change at the inverting input, causing an increase in the frequency of PWM10 and consequent increase in the reactance of choke 25, thereby reducing the voltage at output terminal 64. When the red supply output voltage decreases below rated voltage, the opposite train of events occurs, resulting in decrease of the PWM frequency, decrease of the choke reactance and increase of the output voltage at terminal 64.

Modifications may be made in the embodiment of the invention specifically disclosed. For example, full-wave rectifiers could be used in place of one or more of the half-wave rectifiers illustrated. The core of choke 25 can be made saturable to increase the sensitivity thereof to changes in switching frequency. Other modifications are possible without departing from the scope of the appended claims.

The invention claimed is:

1. A d.c. to d.c. converter type power supply comprising,
   a pulse width modulator for converting input d.c. power to a.c. power having a waveform with a variable frequency and a variable duty cycle;
   a transformer having a primary winding and at least two separate secondary windings, said primary winding receiving a.c. power from said pulse width modulator;
   means including a first rectifier connected to one of said transformer secondary windings and a capacitor input type filter connected to said first rectifier for converting a.c. voltage induced in said one secondary winding to a first d.c. voltage output;

means for converting a.c. voltage induced in the other said secondary winding to a second d.c. voltage output, including:

a second rectifier connected to said other secondary winding;

an inductor input type filter connected to said second rectifier, said filter having first and second output terminals through which current is supplied to a load and across which said second d.c. voltage appears as a potential difference;

shunt-type voltage regulator means connected between said first and second terminals for diverting current from said terminals, said regulator means including a source of reference voltage;

means for comparing said second d.c. voltage with said reference voltage; and variable impedance means responsive to said comparing means for controlling current flow through said regulator means;

means providing a first signal related to said first d.c. voltage output for controlling the duty cycle of the output wavefrom of said pulse width modulator; and means providing a second signal related to said second d.c. voltage output for controlling the frequency of the output waveform of said pulse width modulator.

2. A power supply as claimed in claim 1 wherein said regulator means include:

means for sensing the current flow through said regulator means; and means responsive to said current sensing means for providing said second signal for controlling the frequency of said output waveform of said pulse width modulator.

3. A power supply as claimed in claim 1 wherein said inductor input type filter includes an inductor having a core of saturable magnetic material.

4. A power supply as claimed in claim 2 wherein said means responsive to said current sensing means for providing said second signal comprises:

integrating means receiving the output of said current sensing means and providing an output proportional to the time integral of the output of said current sensing means, said integrating means output constituting said second signal.

* * * * *